United States Patent
Kim et al.

(10) Patent No.: US 8,968,909 B2
(45) Date of Patent: Mar. 3, 2015

(54) FIBROUS SEPARATION MEMBRANE FOR SECONDARY BATTERY AND MANUFACTURING METHOD THEREOF

(75) Inventors: Sun Ok Kim, Seoul (KR); Young Seuck Yoo, Seoul (KR); Jin Wook Na, Gyunggi-do (KR)

(73) Assignee: Samsung Electro-Mechanics Co., Ltd, Gyunggi-Do (KR)

( * ) Notice: Subject to any disclaimer, the term of this patent is extended or adjusted under 35 U.S.C. 154(b) by 250 days.

(21) Appl. No.: 13/160,849

(22) Filed: Jun. 15, 2011

(65) Prior Publication Data
US 2012/0251853 A1    Oct. 4, 2012

(30) Foreign Application Priority Data
Mar. 28, 2011    (KR) .................. 10-2011-0027784

(51) Int. Cl.
    *H01M 2/16* (2006.01)
(52) U.S. Cl.
    CPC ............ *H01M 2/162* (2013.01); *H01M 2/1686* (2013.01); *H01M 2220/20* (2013.01)
    USPC .............................. 429/144; 429/62; 429/145
(58) Field of Classification Search
    USPC .......................................... 429/62, 145, 144
    See application file for complete search history.

(56) References Cited

U.S. PATENT DOCUMENTS

| 2006/0286446 A1* | 12/2006 | Chun et al. ................... 429/142 |
| 2010/0124701 A1* | 5/2010 | Naoi et al. .................... 429/144 |
| 2010/0233812 A1* | 9/2010 | Sun et al. ...................... 435/401 |

FOREIGN PATENT DOCUMENTS

| JP | 2010-103050 | 5/2010 | .............. H01M 2/16 |
| KR | 10-0845239 | 7/2008 | .............. H01M 2/16 |
| WO | WO 2011/033975 | 3/2011 | .............. H01M 2/16 |

OTHER PUBLICATIONS

Applicant-provided Office Action issued for related Japanese Patent Application No. 2011-121295, dated Apr. 2, 2013, and its English summary, also provided by the Applicant.
Applicant-provided Office Action issued for related Korean Patent Application No. 10-2011-0027784, dated Feb. 25, 2013, and its English summary, also provided by the Applicant.

* cited by examiner

*Primary Examiner* — Zachary Best
(74) *Attorney, Agent, or Firm* — Ladas & Parry, LLP

(57) ABSTRACT

Disclosed herein is a fibrous separation membrane for secondary batteries, comprising: a polymer layer which partially melts and blocks pores thereof thus cutting off electric current when a temperature of a secondary battery is increased; and heat-resistant resin layers applied on both sides of the polymer layer.

4 Claims, 2 Drawing Sheets

FIBROUS SEPARATION MEMBRANE FOR SECONDARY BATTERY AND MANUFACTURING METHOD THEREOF

CROSS-REFERENCE TO RELATED APPLICATION

This application claims the benefit of Korean Patent Application No. 10-2011-0027784, filed Mar. 28, 2011, entitled "Secondary battery fibrous separation membrane and method thereof;" which is hereby incorporated by reference in its entirety into this application.

BACKGROUND OF THE INVENTION

1. Technical Field

The present invention relates to a fibrous separation membrane for secondary batteries, and a method of manufacturing the same.

2. Description of the Related Art

A secondary battery is a battery which can be reused because it can be recharged using external energy and returned to an original state after being discharged.

Such a secondary battery is characterized in that it has high power density, it can do high-power discharge, and it is only slightly influenced by temperature.

Recently, green energy has attracted considerable attention, and thus secondary batteries have expanded their fields to IT, EV, ESS, and the like.

The demand for secondary batteries is rapidly increasing, and the function of secondary batteries is also becoming highly functionalized.

Such a secondary battery includes the four major components of a cathode active material, an anode active material, an electrolyte and a separation membrane. Among them, a separation membrane serves to separate a cathode active material and an anode active material, and is used as an ion transfer passage. As such, since a separation membrane serves to provide an ion transfer passage and prevent foreign matter from moving, it must have pores having a size of several micrometers or less.

Conventional separation membranes are mostly formed by a wet process or a dry process.

The wet process is a process of forming pores by phase-separating a solution containing a polymer, a solvent and other components and then stretching the phase-separated product, and the dry process is a process of forming pores by extruding a polymer and then stretching the extruded polymer.

Since biaxial stretching must be conducted in the wet process, the wet process is advantageous in that pores are non-oriented, but is disadvantageous in that manufacturing costs are high. In contrast, since uniaxial stretching must be conducted in the dry process, the dry process is disadvantageous in that pores are oriented, but is advantageous in that manufacturing costs are low.

All of the separation membranes formed by the wet process or the dry process are made of polyolefin-based resins. The separation membrane is generally made of two kinds of resins, namely polyethylene and polypropylene. The separation membrane is produced by mixing the two kinds of resins or laminating them.

The separation membrane made of polyethylene is advantageous in the shutdown of a secondary battery because of its low melting point, but is problematic in that it is greatly thermally constricted at high temperature because its melting point is low. In contrast, the separation membrane made of polypropylene is advantageous in thermal constriction, but is disadvantageous in the shutdown of a secondary battery because of its high melting point.

SUMMARY OF THE INVENTION

Accordingly, the present invention has been devised to solve the above-mentioned problems, and the present invention intends to provide a fibrous separation membrane for secondary batteries, which can satisfy both heat resistance and stability by using a heat-resistant resin together with a low-melting polymer that can conduct a shutdown function.

An aspect of the present invention provides a fibrous separation membrane for secondary batteries, including: a polymer layer which partially melts and blocks pores thereof thus cutting off electric current when a temperature of a secondary battery is increased; and heat-resistant resin layers applied on one side of the polymer layer or both sides of the polymer layer.

Here, the polymer layer may be formed of a polymer material having a melting point of 100~180° C.

Further, the polymer layer may have a thickness of 5~100 μm and a porosity of 20~90%.

Further, each of the heat-resistant resin layers may be formed of any one selected from the group consisting of aromatic polyesters, polyphosphazenes, polyurethane, polyurethane copolymers including polyetherurethane, cellulose acetate, cellulose acetate butylate, cellulose acetate propionate, polyvinylidene fluoride, perfluoropolymers, polyvinylchloride, polyvinylidene chloride, polyethyleneglycol derivatives, polyoxide, polyvinyl acetate, polystyrene, polyacrylonitrile, and polymethacrylate.

Further, each of the heat-resistant resin layers may have a thickness of 1~200 μm. Another aspect of the present invention provides a method of manufacturing a fibrous separation membrane for secondary batteries, including: forming a polymer layer by electrospinning; and electrospinning a heat-resistant resin solution onto both sides of the polymer layer to form ultrafine-fibrous heat-resistant resin layers on one side of the polymer layer or both sides of the polymer layer.

Here, the polymer layer may have a thickness of 5~100 μm and a porosity of 20~90%.

Further, each of the heat-resistant resin layers may have a thickness of 1~200 μm.

Further, the method may further include: conducting press lamination after forming the heat-resistant layers on both sides of the polymer layer.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe the best method he or she knows for carrying out the invention.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
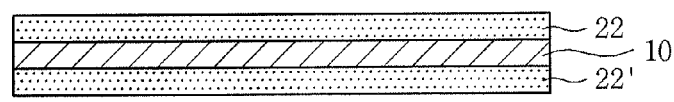
FIG. 1 is a sectional view showing a fibrous separation membrane for secondary batteries according to a first embodiment of the present invention.

The objects, features and advantages of the present invention will be more clearly understood from the following detailed description of preferred embodiments taken in conjunction with the accompanying drawings. Throughout the accompanying drawings, the same reference numerals are used to designate the same or similar components, and redundant descriptions thereof are omitted. Further, in the description of the present invention, when it is determined that the detailed description of the related art would obscure the gist of the present invention, the description thereof will be omitted.

Hereinafter, preferred embodiments of the present invention will be described in detail with reference to the attached drawings.

FIG. 1 is a sectional view showing a fibrous separation membrane for secondary batteries according to a first embodiment of the present invention.

As shown in FIG. 1, the fibrous separation membrane for secondary batteries according to the first embodiment of the present invention includes a low-melting polymer layer 10, and heat-resistant resin layers 22 and 22' applied on both sides of the low-melting polymer layer 10.

The low-melting polymer layer 10 conducts a shutdown function of cutting off electric current by blocking pores using the molten low-melting polymer occurring when the temperature of a secondary battery excessively becomes high.

This low-melting polymer layer 10 is formed of a polyolefin-based resin or a polymer such as polyethylene (PE), polypropylene (PP) or a copolymer thereof.

Further, for the purpose of shutdown function, it is preferred that the low-melting polymer layer 10 be formed of a polymer material having a melting point of 100~180° C., preferably 120~150° C.

Here, a polyolefin resin or a polymer is used to form the low-melting polymer layer 10, but the present invention is not limited thereto. All of the polymer materials having a melting point of 100~180° C. can be used.

The low-melting polymer layer 10 has a thickness of 5~100 μm and a pore size of 1~5000 nm. Further, the low-melting polymer layer 10 has a porosity of 20~90%, preferably 40~60%.

The heat-resistant resin layers 22 and 22' are applied on both sides of the low-melting polymer layer 10, function to allow a separation membrane not to be destroyed by melting when the temperature of a secondary battery is continuously increased even after the low-melting layer 10 conducted a shutdown function, and have a melting point of 180° C. or higher.

The heat-resistant resin layers 22 and 22' are made of a polymer having a melting point of 180° C. or having no melting point. Examples of the polymer having a melting point of 180° C. or having no melting point may include: aromatic polyesters, such as polyamide, polyimide, polyamideimide, poly(meta-phenyleneisophthalamide), ploysulfone, polyether ketone, polyether imide, polyethylene terephthalate, polytrimethylene terephthalate, polyethylene naphthalate, and the like; polyphosphazenes, such as polytetrafluoroethylene, polydiphenoxyphosphazene, poly{bis[2-(2-methoxyethoxy)phosphazene]}, and the like; polyurethane; polyurethane copolymers, such as polyetherurethane, and the like; cellulose acetate; cellulose acetate butylate; cellulose acetate propionate; polyvinylidene fluoride; perfluoropolymers; polyvinylchloride; polyvinylidene chloride; polyethyleneglycol derivatives; polyoxide; polyvinyl acetate; polystyrene; polyacrylonitrile; polymethacrylate; and the like.

Here, the polymer having no melting point is referred to as a polymer that burns without melting even at 180° C. or higher.

As such, the fibrous separation membrane for secondary batteries is formed by forming the low-melting polymer layer 10 using electrospinning and then forming the heat-resistant resin layers 22 and 22' on both sides of the low-melting polymer layer 10 using electrospinning.

Meanwhile, the principle of the electro spinning was patented by Formhals, a German engineer, in 1934, base on the liquid falling test of Raleigh in 1882, where electrostatic force overcomes surface tension.

Unlike in the case of electrostatic spray for forming low-viscosity liquid into ultrafine droplets under an electric field having a high voltage of critical voltage or more, in the electrospinning, ultrafine fiber is formed when high-voltage electrostatic force is applied to a polymer solution or molten polymer having sufficient viscosity.

In the present invention, the low-melting polymer layer 10 and the heat-resistant resin layers 22 and 22' may be formed using meltblown spinning or flash spinning in addition to the electrospinning. In the meltblown spinning or flash spinning, ultrafine fiber is formed by high-voltage electric field and air injection.

For example, electroblowing can also be used. Therefore, in the present invention, the electrospinning includes the above-mentioned spinning methods.

Figure 2:
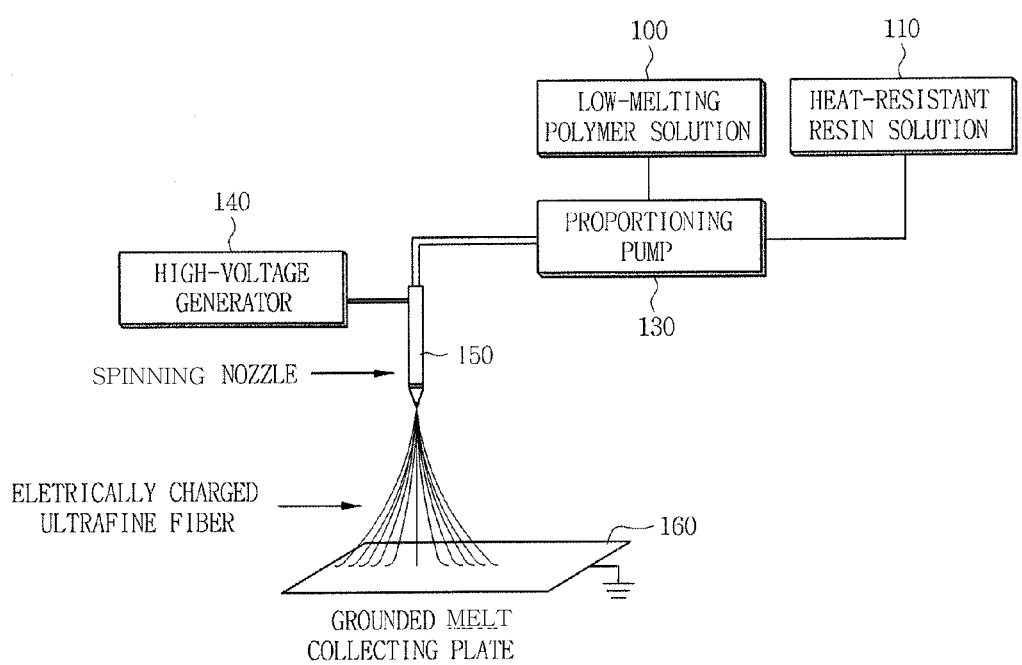
FIG. 2 is a schematic view showing an electrospinning apparatus which can be used to manufacture the fibrous separation membrane for secondary batteries according to the present invention.

FIG. 2 is a schematic view showing an electrospinning apparatus which can be used to manufacture the fibrous separation membrane for secondary batteries according to the present invention.

As shown in FIG. 2, the electrospinning apparatus includes a first barrel 100 for storing a low-melting polymer solution, a second barrel 110 for storing a heat-resistant resin solution, a proportioning pump 130 for discharging the low-melting polymer solution or heat-resistant resin solution, a high-voltage generator 140, and a spinning nozzle 150 connected to the high-voltage generator 140.

The low-melting polymer solution or heat-resistant resin solution discharged through the proportioning pump 130 passes through the spinning nozzle 150 electrically charged by the high-voltage generator 140 to be formed into ultrafine fiber, and the ultrafine fiber is collected on a collecting plate 160 grounded in the form of a conveyor moving at a predetermined speed.

Figure 3:
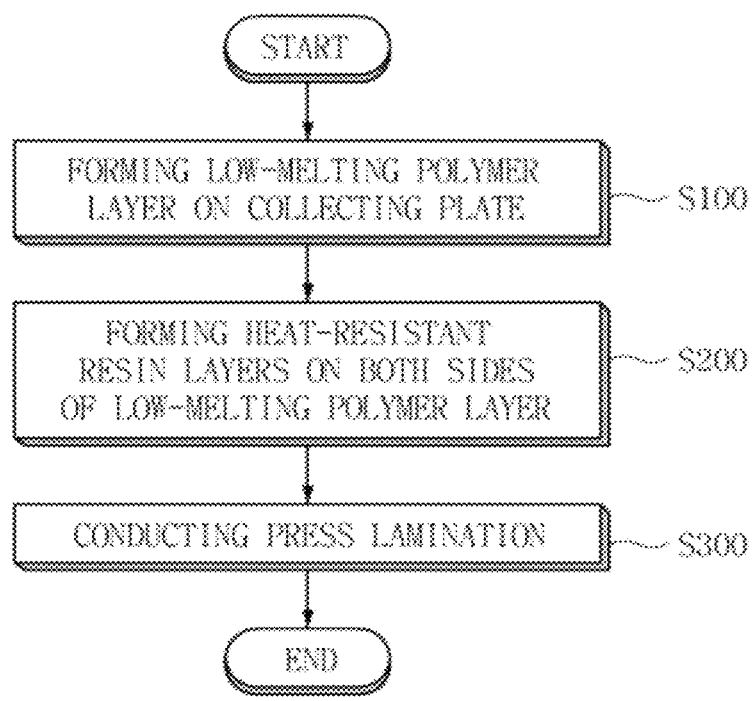
FIG. 3 is a flowchart showing a method of manufacturing the fibrous membrane for secondary batteries according to the first embodiment of the present invention.

FIG. 3 is a flowchart showing a method of manufacturing the fibrous membrane for secondary batteries according to the first embodiment.

As shown in FIG. 3, in the method of manufacturing the fibrous membrane for secondary batteries according to the first embodiment, first, a low-melting polymer solution is put into a first barrel of an electrospinning apparatus, the low-melting polymer solution is discharged using a proportioning pump, and then a spinning nozzle is electrically charged using a high-voltage generator, thus forming a low-melting polymer layer on a collecting plate grounded in the form of a conveyor moving at a predetermined speed (S100).

The low-melting polymer layer formed on the collecting plate is a polyolefin-based resin layer having a thickness of 5~100 μm and a porosity of 20~90%.

Subsequently, a heat-resistant resin solution is put into a second barrel of an electrospinning apparatus, the heat-resistant resin solution is discharged using a proportioning pump, and then a spinning nozzle is electrically charged using a high-voltage generator, thus forming heat-resistant resin layers on both sides of the low-melting polymer layer (S200).

Figure 4:
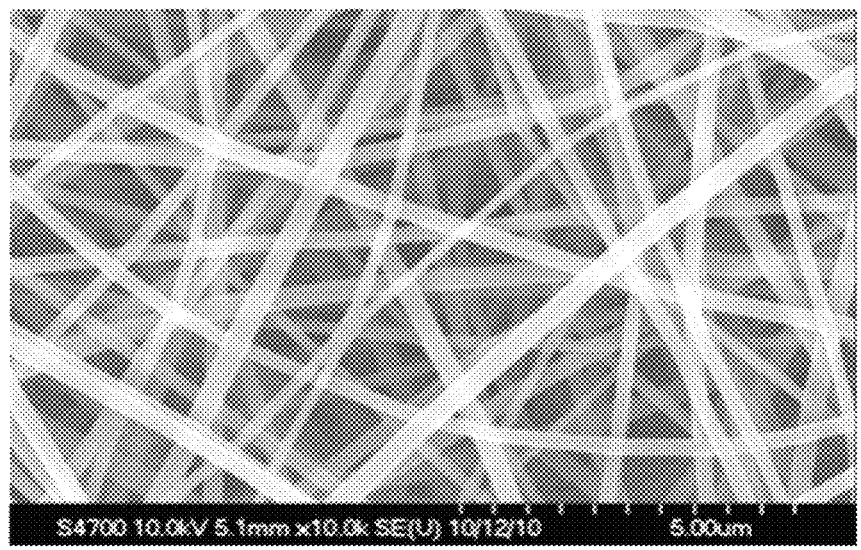
FIG. 4 is a scanning electron microscope (SEM) photograph showing the morphology of the fibrous separation membrane according to the first embodiment of the present invention.

According to the electrospinning of the heat-resistant resin solution, as shown in FIG. 4, ultrafine fiber having a size of several nanometers to several thousands of nanometers can be formed. Further, simultaneously with the formation of ultrafine fiber, the ultrafine fiber is fusion-bonded in the form of a three-dimensional network structure, thus forming the ultrafine fiber into a porous ultrafine fiber web.

This porous ultrafine fiber web is ultrathin and ultralight, and the ratio of surface area to volume thereof is higher than that of conventional fiber. Further, the porous ultrafine fiber web has high porosity. In the formation of the heat-resistant ultrafine fiber layer, a solvent is volatilized during an ultrafine fiber forming process, and pores are formed by the gap between ultrafine fibers, so that uniform pores are obtained, and a solvent extracting process or a pore forming process is not required.

The heat-resistant resin solution includes a heat-resistant resin having a melting point of 180° C. or higher such that a separation membrane is not destroyed by melting when the temperature of a secondary battery is continuously increased even after the low-melting layer conducted a shutdown function.

The porosity and pore size of the ultrafine fiber layer is greatly influenced by the diameter of fiber. When the diameter of fiber becomes small, the porosity of the ultrafine fiber layer becomes low, and the pore size thereof becomes small. Further, when the diameter of fiber becomes small, the specific surface area of fiber increases, so that the electrolyte storage capacity of the ultrafine fiber layer increases, with the result that the possibility of electrolyte leakage becomes low.

Therefore, the heat-resistant resin layer may have a fiber diameter of 1~3000 nm, preferably 1~1000 nm, and more preferably 50~800 nm.

Further, the heat-resistant resin layer may have a pore size of 1~5000 nm, preferably to 1~3000 nm, and more preferably 1~1000 nm. In this case, since electrolyte does not leak from the heat-resistant resin layer, the heat-resistant layer can have a high electrolyte storage capacity.

The porosity of the heat-resistant resin layer must not be lower than that of the low-melting polymer layer. In this case, the low-melting polymer layer, on which the heat-resistant resin layer is applied, can maintain high ion conductivity, thus obtaining excellent cycle characteristics at the time of constituting a secondary battery.

Therefore, it is preferred that the porosity of the heat-resistant resin layer be maintained at 30~95%, preferably 40~90%.

Generally, when the low-melting polymer layer is exposed to a temperature of 150□, it is thermally constricted at a ratio of 20% or more. Therefore, the thickness of the heat-resistant resin layer is not particularly limited as long as the thermal constriction ratio of the low-melting polymer layer can be maintained at less than 20%, but the minimum thickness thereof is 1 μm, and the maximum thickness thereof is the thickness of the low-melting polymer layer. Preferably, the heat-resistant resin layer may have a thickness of 1~20 μm, and more preferably 1~10 μm.

Subsequently, in order to increase the adhesion between the low-melting polymer layer and the heat-resistant resin layer and to adjust the porosity and thickness of the heat-resistant resin layer, press lamination is conducted at a predetermined temperature or lower after the heat-resistant resin layer is disposed on the low-melting polymer layer, or is conducted at a predetermined temperature or lower after the separation membrane of the present invention is disposed between a cathode and an anode (S300).

In this case, the press lamination must be conducted at the temperature at which the physical properties of the low-melting polymer resin are not deteriorated.

Meanwhile, in order to improve the mechanical properties, ion conductivity and electrochemical properties of the heat-resistant resin layer and to enhance the interaction between the heat-resistant resin layer and the low-melting polymer layer that is a support, inorganic additives may be added to a heat-resistant resin.

Examples of the inorganic additives which can be used in the present invention may include metal oxides, metal nitrides and metal carbides, such as $TiO_2$, $BaTiO_3$, $Li_2O$, LiF, LiOH, $Li_3N$, BaO, $Na_2O$, $Li_2CO_3$, $CaCO_3$, $LiAlO_2$, $SiO_2$, $Al_2O_3$, PTFE, and mixtures thereof. The amount of the inorganic additive may be 1~95 wt %, preferably 5~50 wt %, based on a polymer constituting an ultrafine fiber layer. In particular, in order to control the increase in temperature of a secondary battery attributable to the decomposition reaction between an anode and an electrolyte and to control the chemical reaction accompanying gas generation, glass containing $SiO_2$ may be preferably used as the inorganic additive.

As described above, according to the present invention, both heat resistance and stability can be satisfied because a heat-resistant resin is used together with a low-melting polymer that can conduct a shutdown function.

Further, according to the present invention, a thin separation membrane can be obtained, so that a secondary battery generates high power, thereby improving the performance of a secondary battery.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing a fibrous separation membrane for secondary batteries, comprising:
   applying a low-melting polymer solution to a first barrel of an electrospinning apparatus including a first barrel for storing the low-melting polymer solution composing the polymer layer, a second barrel for storing a heat-resistant resin solution, a proportioning pump for discharging the low-melting polymer solution or heat-resistant resin solution, and a spinning nozzle connected to a voltage generator, discharging the low-melting polymer solution by using the proportioning pump, electrically charging the spinning nozzle by using the voltage generator and forming the polymer layer composed of polymer substances by electrospinning in a collecting plate grounded in the form of a conveyor moving at a predetermined speed; and
   after applying the heat-resistant resin solution to a second barrel, discharging the heat-resistant resin solution by using the proportioning pump and electrically charging the spinning nozzle by using the voltage generator, electrospinning the heat-resistant resin solution onto both sides of the polymer layer to form ultrafine-fibrous heat-resistant resin layers on both sides of the polymer layer, wherein a porosity of the heat-resistant resin layers is the same or higher than a porosity of the polymer layer, and wherein the low-melting polymer solution has a melting temperature lower than the heat-resistant resin solution.

2. The method according to claim 1, wherein the polymer layer has a thickness of 5~100 μm and a porosity of 20~90%.

3. The method according to claim 1, wherein each of the heat-resistant resin layers has a thickness of 1~200 μm.

4. The method according to claim 1, further comprising: conducting press lamination after forming the heat-resistant layers on both sides of the polymer layer.

* * * * *